US008275734B1

(12) United States Patent
Bridgman

(10) Patent No.: US 8,275,734 B1
(45) Date of Patent: Sep. 25, 2012

(54) SYSTEMS AND METHODS FOR RETURNED MAIL

(75) Inventor: Ed Bridgman, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 657 days.

(21) Appl. No.: 12/479,227

(22) Filed: Jun. 5, 2009

(51) Int. Cl.
*G06N 5/02* (2006.01)
*G06N 5/04* (2006.01)

(52) U.S. Cl. ........................................... 706/47; 706/48

(58) Field of Classification Search ..................... 706/47
See application file for complete search history.

(56) References Cited

U.S. PATENT DOCUMENTS 6,791,050 B2 9/2004 Daniels, Jr. et al.
6,801,833 B2 * 10/2004 Pintsov et al. ................ 700/223
6,826,548 B2 * 11/2004 Hungerpiller et al. ........ 705/401
2003/0055791 A1 * 3/2003 Bodie et al. ..................... 705/62
2005/0049890 A1 3/2005 Kan
2006/0112024 A1 5/2006 Wadd et al.

OTHER PUBLICATIONS

"Improving Parcel & Postal Operations with Bar Code Printing", A Zebra Black & White Paper, 2007, 12 pages.

* cited by examiner

*Primary Examiner* — Jeffrey A Gaffin
*Assistant Examiner* — Nathan Brown, Jr.
(74) *Attorney, Agent, or Firm* — Brooks, Cameron & Huebsch, PLLC

(57) ABSTRACT

A system, method, and computer-usable medium are disclosed for providing automated processing of returned mailpieces. Recipient data and mailpiece data are processed to generate a mailpiece operation rule, all of which are then encoded to generate a unique identifier. The unique identifier is then indexed to its corresponding recipient data, mailpiece data, and mailpiece operation rule and thereafter associated with a corresponding mailpiece, which is then sent to an intended recipient. If the sent mailpiece is undeliverable to its intended recipient, it is returned and its unique identifier is scanned and then decoded to extract its corresponding recipient data, mailpiece data, and mailpiece operation rule. The extracted mailpiece operation rule is then processed to initiate a corresponding returned mailpiece operation.

19 Claims, 7 Drawing Sheets

SYSTEMS AND METHODS FOR RETURNED MAIL

BACKGROUND

1. Field of the Disclosure

Embodiments of the disclosure relate in general to the field of computers and similar technologies, and in particular to software utilized in this field. Still more particularly, it provides a system, method, and computer-usable medium for providing automated processing of returned mailpieces.

2. Description of the Related Art

It is not uncommon for large companies, such as financial institutions and insurance providers, to receive thousands of pieces of returned mail every day. Even after automatically resending that mail, a large percentage (e.g., ~30%) gets returned a second time. Typically, each piece of returned mail is opened, checked, and reprocessed, which costs time and money. In many cases, returned mailpieces are treated the same, regardless of their respective value. As an example, a quarterly 401K statement, or an insurance refund check, may be treated with the same level of priority as an advertising flyer.

Maintaining the accuracy of recipient data, such as the recipient's name and address, presents additional challenges for large volume mailers. One approach to this issue is the Address Correction Service (ACS) offered by the United States Postal Service (USPS). However, implementing the USPS ACS is known to be labor intensive and costly. Recently, the USPS has announced the Intelligent Mail Barcode, a height-modulated barcode that encodes up to 31-digits of mailpiece data into 65 vertical bars. The data encoded in the Intelligent Mail Barcode comprises four information elements: a service type identifier, a mailer ID, a sequence number, and a delivery point ZIP code.

However, all of these information elements are primarily oriented to facilitate the delivery of a mailpiece, not processing its return, and their use in providing corrected recipient name and address information is incidental. Furthermore, the Intelligent Mail Barcode and its USPS predecessors are incapable of cross-referencing recipient data, such as a recipient's name, address, or account number to a given mailpiece. Moreover, they fail to provide enhanced mailpiece data relating to the contents of an individual mailpiece. As a result, it is has become common for large mailers to have a staff of several employees whose primary responsibility is to receive returned mailpieces and manually determine the reason for their return. If their corresponding recipient information is incorrect, then it has to be corrected, which often involves tedious, manual, and error-prone processes. Then, each returned mailpiece has to be further processed so it can be resent, all of which incurs additional costs.

BRIEF SUMMARY

A system, method, and computer-usable medium are disclosed for providing automated processing of returned mailpieces. In various embodiments, recipient data and mailpiece data are processed to generate a mailpiece operation rule. The recipient data, mailpiece data, and mailpiece operation rule are then encoded to generate a unique identifier. In various embodiments, the unique identifier comprises a bar code, such as 3-D barcode, which is imprinted on the mailpiece, or a Radio Frequency Identifier (RFID) tag, which is affixed to mailpiece. The unique identifier is then indexed to its corresponding recipient data, mailpiece data, and mailpiece operation rule and thereafter associated with a corresponding mailpiece, which is then sent to an intended recipient.

If the sent mailpiece is undeliverable to its intended recipient, it is returned and scanned to read its unique identifier. Once scanned, decoding operations are performed on the unique identifier to extract its corresponding recipient data, mailpiece data, and mailpiece operation rule. The extracted mailpiece operation rule is then processed to initiate a corresponding returned mailpiece operation. In various embodiments, repositories of recipient data are queried for updates to the recipient data. In various other embodiments, the intended recipient of the returned mailpiece is contacted for updates to their corresponding recipient data and recipient data, mailpiece data, and returned mailpiece operation options are respectively provided within a user interface (UI).

In one embodiment, the returned mailpiece is resent using updated recipient data. It will be appreciated that the returned mailpiece may be resent or a copy of the originally sent mailpiece may be resent to the recipient. In another embodiment, the returned mailpiece is resent using the same recipient data. As an example, the intended recipient's recipient data, such as their name and address, has been verified and the mailpiece was returned for some other reason. In yet another embodiment, the recipient data is not updated and the returned mailpiece is not resent.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

Figure 1:
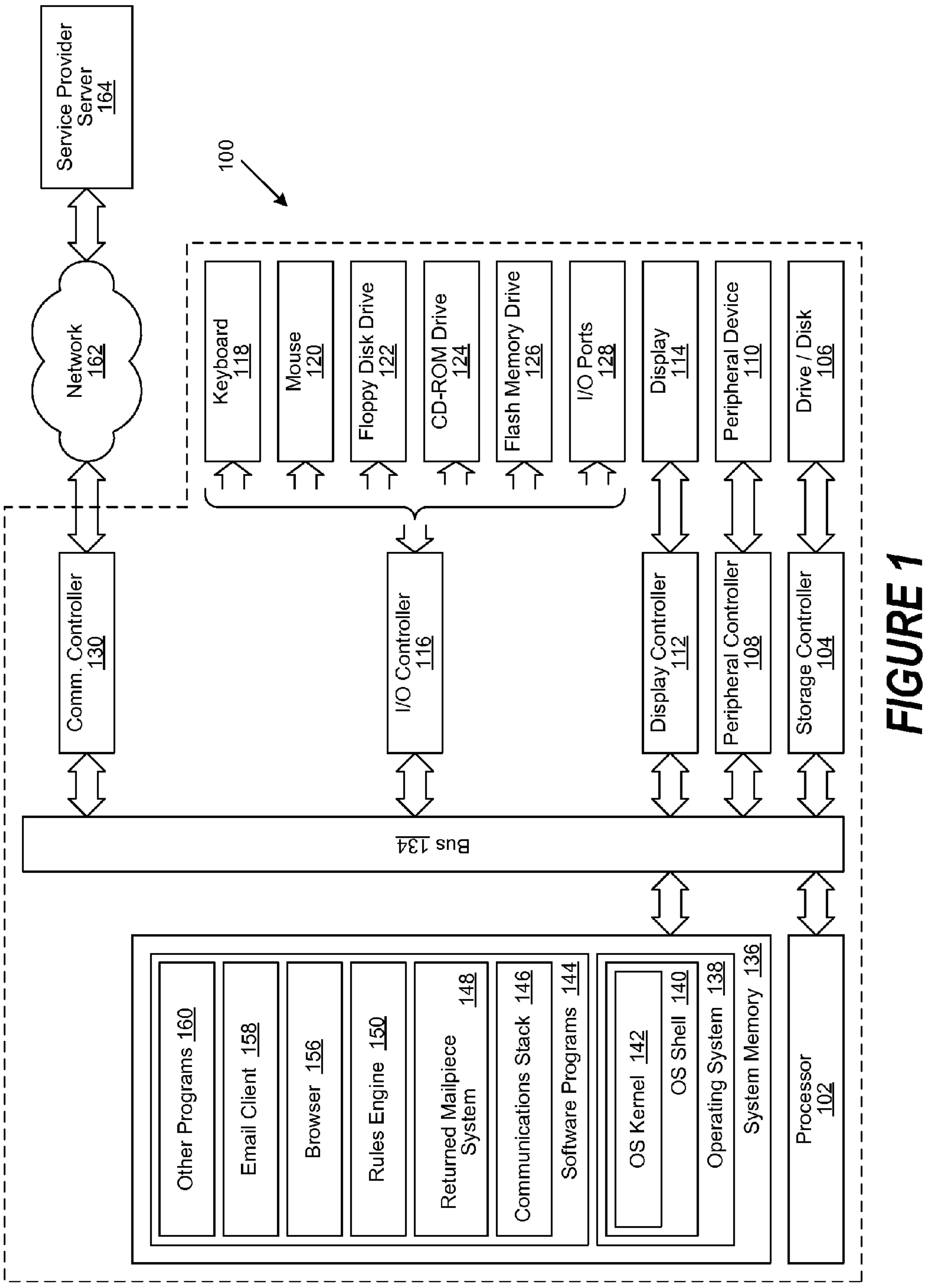
FIG. 1 depicts an exemplary client information processing system (IPS) in which embodiments of the disclosure may be implemented.

A method, system and computer-usable medium are disclosed for providing automated processing of returned mailpieces. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a Returned Mailpiece System 148 and a Rules Engine 150. The Returned Mailpiece System 148 includes computer executable instructions for implementing the processes described in FIGS. 2-7 described hereinbelow. In one embodiment, client IPS 100 is able to download the computer executable instructions of the Returned Mailpiece System 148 from a service provider server 164 located at a remote location. In another embodiment, the computer executable instructions of the Returned Mailpiece System 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
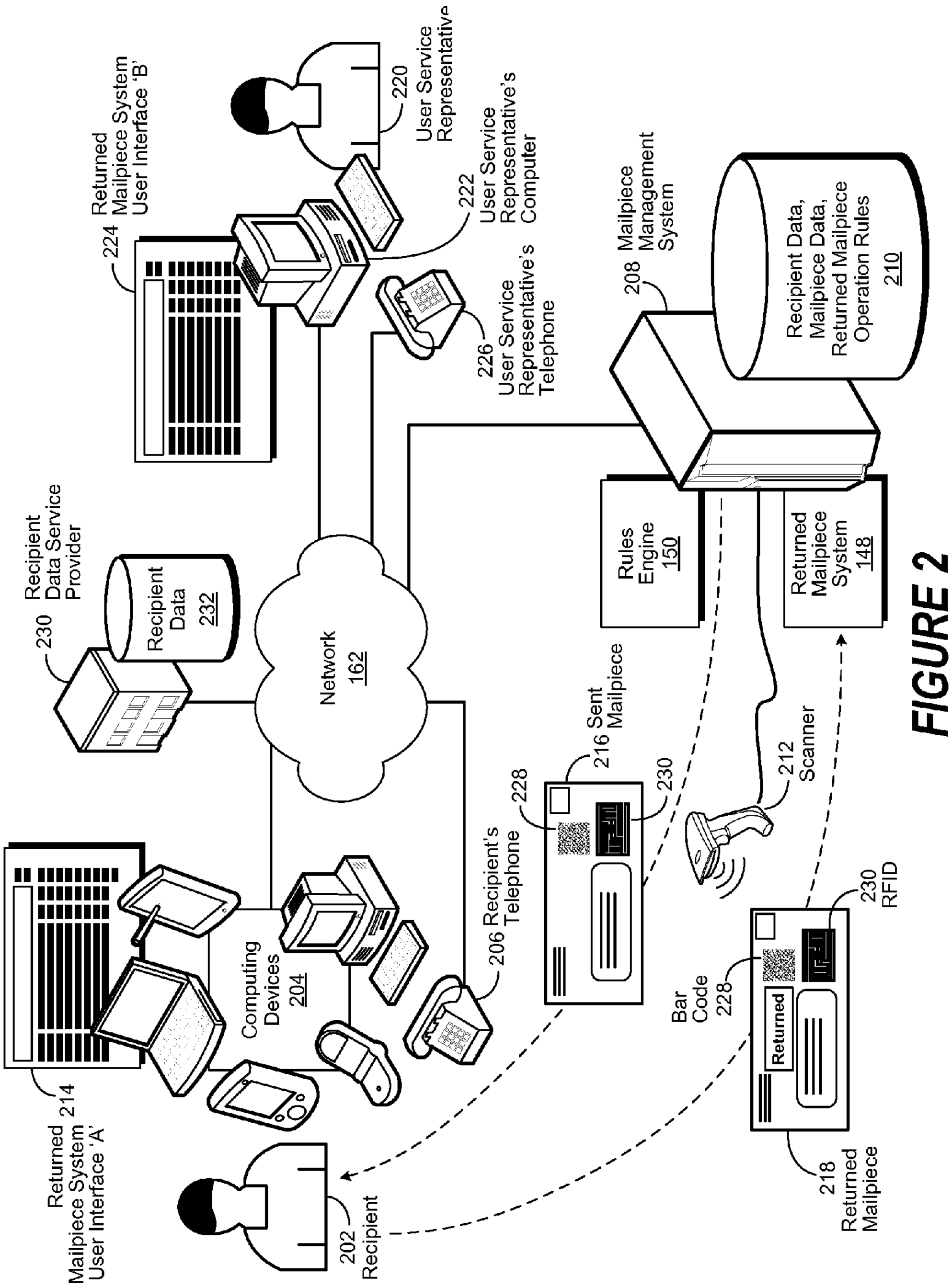
FIG. 2 is a simplified block diagram of a returned mailpiece system as implemented in an embodiment of the disclosure.

FIG. 2 is a simplified block diagram of a returned mailpiece system as implemented in an embodiment of the disclosure. In various embodiments, a returned mailpiece system 148 is implemented with a mailpiece processing system 208 to provide automated processing of returned mailpieces. As used herein, a mailpiece broadly refers to any item intended for delivery to a recipient. In various embodiments, the mailpiece may be an envelope or other flat mailpiece, a parcel, or any container of content deliverable by a postal service or commercial carrier. As likewise used herein, a returned mailpiece refers to a mailpiece that has been deemed undeliverable to its intended recipient and has been returned to its sender. Mailpiece data, as used herein, refers to data associated with a mailpiece, such as its contents, priority, dimensions, or weight. As an example, 'homeowner's insurance policy,' 'quarterly 401K statement,' and 'on-line banking promotional flyer' are all examples of mailpiece data referring to the contents of a mailpiece. As another example, 'high,' 'medium,' and 'low' may refer to delivery priority mailpiece data. Skilled practitioners of the art will recognize that many such examples of mailpiece data are possible and the foregoing is not intended to limit the spirit scope or intent of the disclosure. As used herein, recipient data refers to any data associated with an intended recipient of a mailpiece. More specifically, recipient data includes a recipient's name, address, telephone, electronic mail, instant messaging, and other contact information.

In this embodiment, the mailpiece management system comprises a rules engine 150, operable to process returned mailpiece rules, and a repository of recipient data, mailpiece data, and returned mailpiece operation rules 210. A returned mailpiece operation rule, as used herein, refers to a rule processable by a rules engine that defines an action or operation to be performed related to a returned mailpiece. In various embodiments, recipient data and mailpiece data are processed to generate a mailpiece operation rule. The recipient data, mailpiece data, and mailpiece operation rule are then encoded to generate a unique identifier. In various embodiments, the unique identifier comprises a bar code, such as 3-D barcode 228, which is imprinted on the mailpiece 216. In various other embodiments, the unique identifier comprises a Radio Frequency Identifier (RFID) tag 230, which is affixed to mailpiece 216.

Once added, the unique identifier 228, 230 is then indexed to its corresponding recipient data, mailpiece data, and mailpiece operation rule in the repository of recipient data, mailpiece data, and returned mailpiece operation rules 210. The unique identifier 228, 230 is then associated with a corresponding mailpiece 216, which is then sent to an intended recipient 202.

If the sent mailpiece 216 is undeliverable to its intended recipient 202, it is returned a returned mailpiece 218. The unique identifier 228, 230 associated with the returned mailpiece 218 is then scanned by scanner 212, which in various embodiments comprises a barcode scanner or an RFID scanner. Once the unique identifier 228, 230 has been scanned, decoding operations are performed by the returned mailpiece system 148 to extract its corresponding recipient data, mailpiece data, and mailpiece operation rule. The extracted mailpiece operation rule is then processed by the rules engine 150 and the result of the processed mailpiece operation rule is provided to the returned mailpiece system 148 to initiate its corresponding returned mailpiece operation.

If it is decided to verify the accuracy of the recipient data associated with the returned mailpiece 218, then the repository of recipient data, mailpiece data, and returned mailpiece operation rules 210 is queried for updates to the recipient data. If there are no updates to the recipient data, then a repository of recipient data 232 associated with a recipient data service provider 230 for updates to the recipient data. As an example, the United States Postal Service (USPS) maintains an electronic Address Change Service (ACS), referred to as OneCode ACS, which is available to mailers who adopt the Intelligent Mailpiece Barcode (IMB) on their mailpieces. Commercial address change service providers are likewise known in the art.

If it is determined that the recipient data service provider 230 is unable to provide updates to the recipient data, then a determination is made whether to contact the intended recipient 202 of the returned mailpiece 218 for updates to their corresponding recipient data. If so, then a communication method for communicating with the recipient is determined. In various embodiments, the communication method comprises an electronic communication such as an electronic mail message, an instant messaging (IM) message, a mobile phone text message, an on-line Website session, and the like. In these and other embodiments, computing devices 204 are used by the recipient 202 to conduct the electronic communication. The computing devices 204 may comprise a personal computer, a laptop computer, or a tablet computer. The computing device 244 may also comprise a personal digital assistant (PDA), a mobile telephone, or any other suitable device operable to communicate with the returned mail system 148 over a connection to a network 162. In various other embodiments, the communication method comprises a telephone call between a user service representative 220 and the intended recipient 202. In these and other embodiments, the user service representative 220 uses telephone 226 and the recipient 202 uses telephone 206 to conduct the telephone call. It will be apparent to those of skill in the art that the telephone call may be initiated by either the recipient 202 or the user service representative 220.

Once the communication method is determined, the recipient data, mailpiece data, and returned mailpiece operation options are respectively provided within a user interface (UI) 'A' 214 or 'B' 224 of the returned mail system. As illustrated in FIG. 2, the returned mail system UI 'A' 214 is implemented in the computing device 204 of the intended recipient 202 the returned mail system UI 'B' 224 is implemented in the computer system 222 of the user service representative 220. A determination is then made whether updates to the recipient data were received from the recipient 202. If so, then the recipient data is updated in the repository of recipient data, mailpiece data, and returned mailpiece operation rules 210. In one embodiment, the returned mailpiece 218 is resent using the updated recipient data. It will be appreciated that the returned mailpiece 218 may be resent or a copy of the originally sent mailpiece 216 may be resent to the recipient 202. In another embodiment, the returned mailpiece 218 is resent using the same recipient data. As an example, the intended recipient's recipient data, such as their name and address, has been verified and the mailpiece was returned for some other reason. In yet another embodiment, the recipient data is not updated, the returned mailpiece is not resent, and the recipient data is marked as incorrect in the repository of recipient data, mailpiece data, and returned mailpiece operation rules 210.

Figure 3:
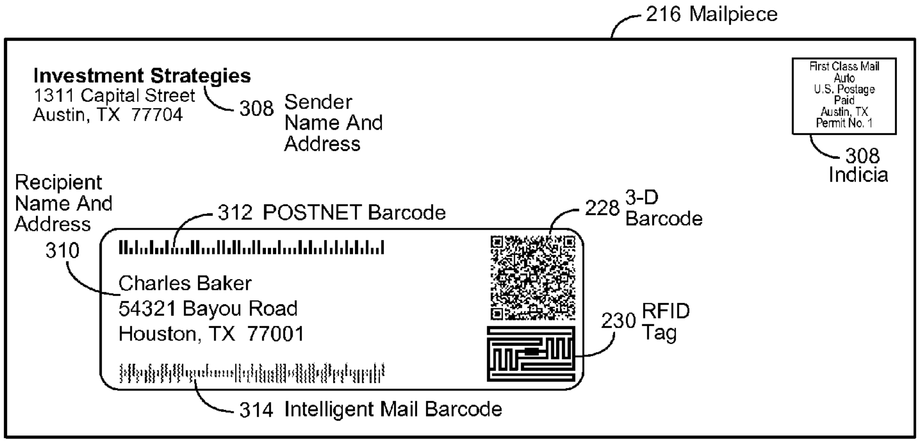
FIG. 3 is a simplified illustration of a unique identifier as implemented with a mailpiece in accordance with an embodiment of the disclosure.

FIG. 3 is a simplified illustration of a unique identifier as implemented with a mailpiece in accordance with an embodiment of the disclosure. In various embodiments, recipient data and mailpiece data are processed to generate a mailpiece operation rule. The recipient data, mailpiece data, and mailpiece operation rule are then encoded to generate a unique identifier, which is associated with a mailpiece 216. In various embodiments, the unique identifier comprises a bar code, such as 3-D barcode 228, which is imprinted on the mailpiece 216. In various other embodiments, the unique identifier comprises a Radio Frequency Identifier (RFID) tag 230, which is affixed to mailpiece 216. In this embodiment, a mailpiece 216 comprises a sender name and address 308, a recipient name and address 310, and indicia 308.

The mailpiece likewise comprises a POSTNET barcode 312, and an Intelligent Mail barcode 314. Those of skill in the art will be familiar with POSTNET (Postal Numeric Encoding Technique) barcodes, used by the United States Postal Service to assist in directing mail. As illustrated in FIG. 3, POSTNET barcodes encode a ZIP Code, or ZIP+4 code, in sequence of half- and full-height bars. In addition, a delivery point is typically added, usually being the last two digits of the recipient's address or their PO box number.

The USPS plans to replace POSTNET with the Intelligent Mail Barcode, which as likewise illustrated in FIG. 3 is a height-modulated barcode that encodes up to 31-digits of mailpiece data into 65 vertical bars. As opposed to POSTNET, the Intelligent Mail Barcode is made up of four bars, each having a different height and vertical placement within the barcode. The data encoded in the Intelligent Mail Barcode comprises four information elements: a service type identifier, a mailer ID, a sequence number, and a delivery point ZIP code. The service type identifier is a value corresponding to a mail class comprising a particular combination of services, such as First Class Mail, or Priority Mail. The mailer ID is a six or nine digit number assigned by the USPS to a sender or a mailer. The sequence number is a unique identifier that is specific to an individual mailpiece and is only valid for 45 days. The delivery point ZIP code is the same data used to currently generate a POSTNET barcode. In view of the foregoing, skilled practitioners of the art will realize that neither POSTNET nor Intelligent Mail barcodes provide the ability to support the cross-referencing of recipient data, such as a recipient's name and address, to a given mailpiece.

Figure 4:
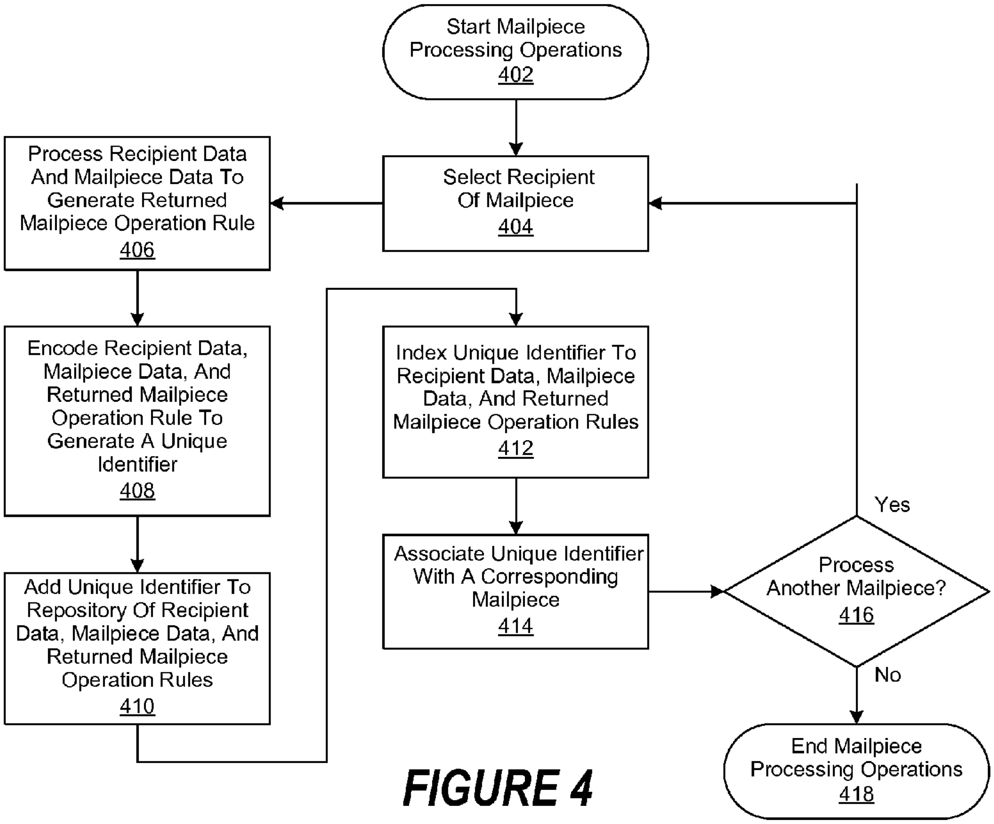
FIG. 4 is a generalized flowchart of the generation of a unique identifier as implemented in accordance with an embodiment of the disclosure for association with a mailpiece.

FIG. 4 is a generalized flowchart of the generation of a unique identifier as implemented in accordance with an embodiment of the disclosure for association with a mailpiece. In this embodiment, mailpiece processing operations are begun in block 402 followed by the selection of a mailpiece recipient in block 404. In block 406, recipient data and mailpiece data are processed to generate a returned mailpiece operation rule. The recipient data, mailpiece data, and mailpiece operation rule are then encoded in block 408 to generate a unique identifier. The resulting unique identifier is then added in block 410 to a repository of recipient data, mailpiece data, and returned mailpiece operation rules. Once added, the unique identifier is then indexed to its corresponding recipient data, mailpiece data, and mailpiece operation rule in block 412. The unique identifier is then associated with a corresponding mailpiece in block 414. In various embodiments, the unique identifier comprises a bar code, such as 3-D barcode, which is imprinted on the mailpiece. In various other embodiments, the unique identifier comprises a Radio Frequency Identifier (RFID) tag, which is affixed to mailpiece. It will be apparent to those of skill in the art that many such embodiments are possible and the foregoing is not intended to limit the spirit, scope, or intent of the disclosure.

Figure 5A:
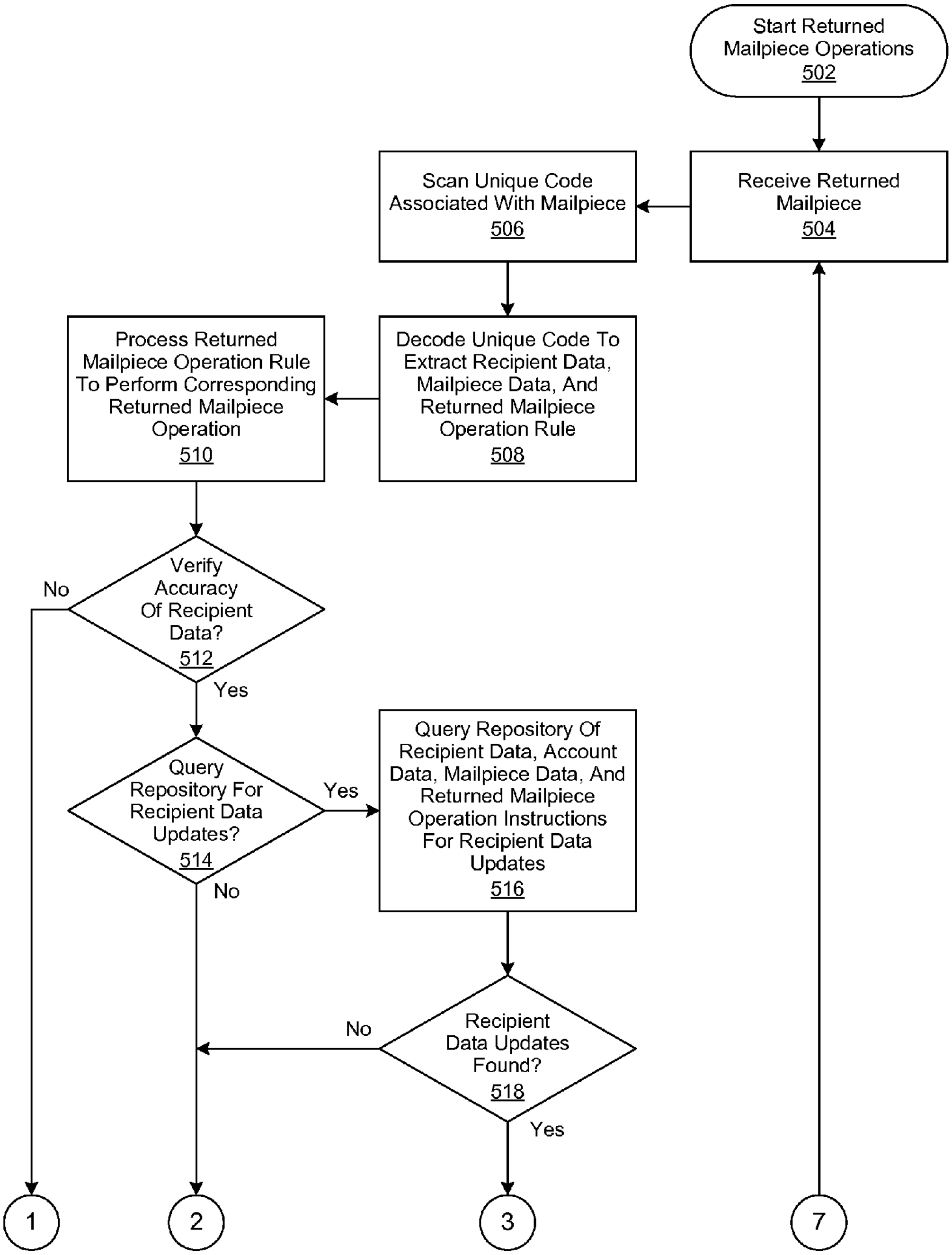
FIGS. 5*a-c* are a generalized flowchart of the operation of a returned mailpiece system as implemented in accordance with an embodiment of the disclosure.
Figure 5B:
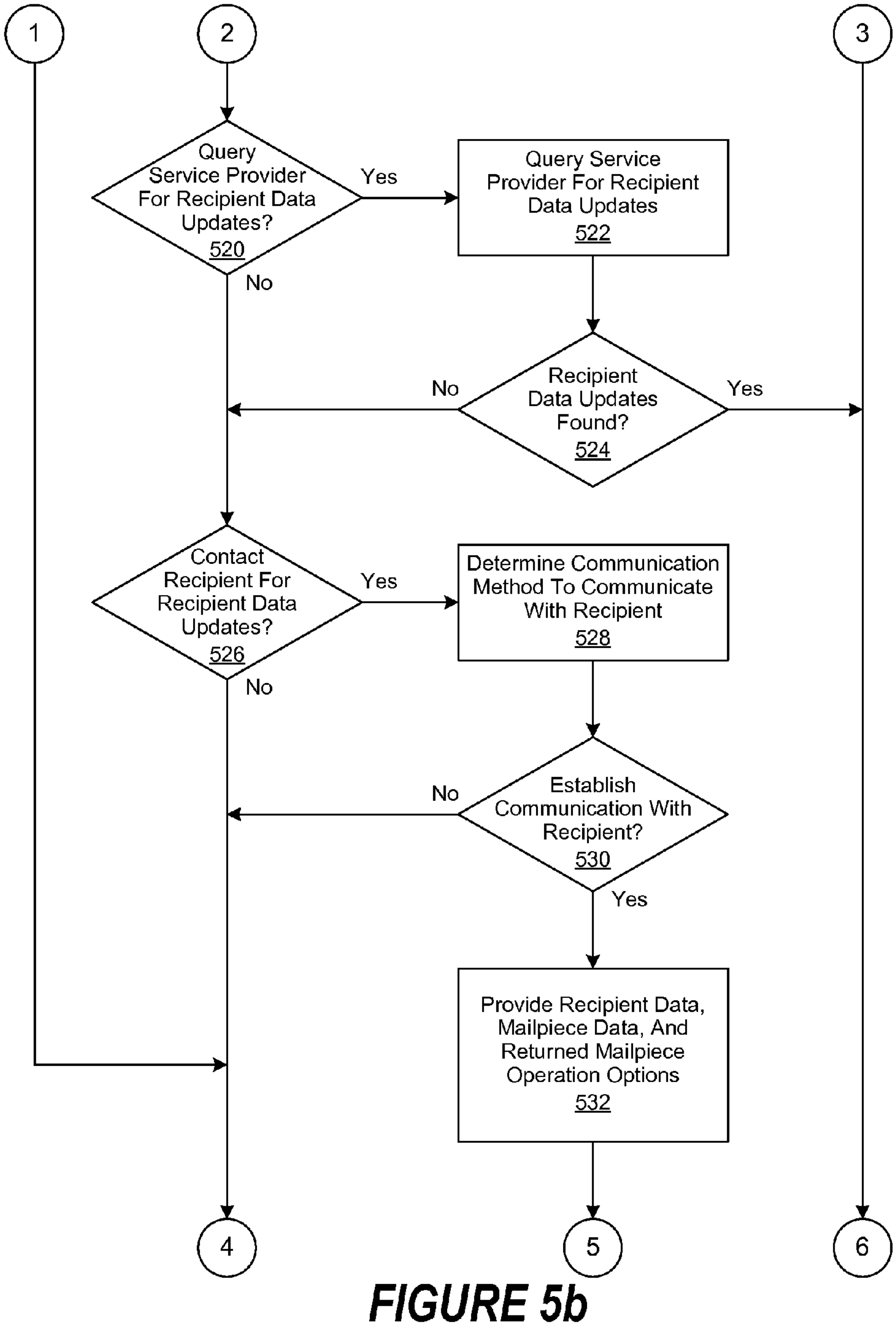
Figure 5C:
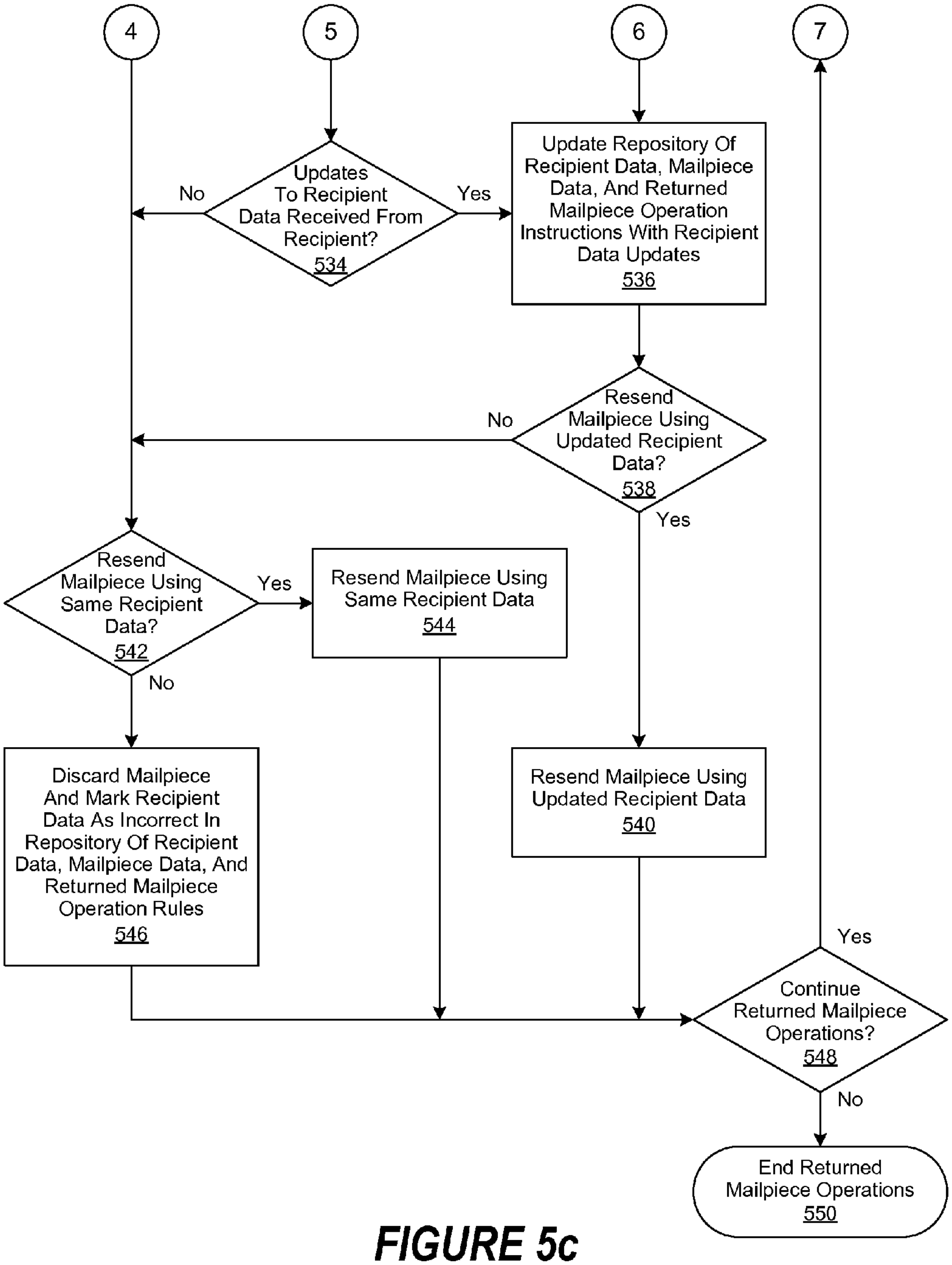

FIGS. 5*a-c* are a generalized flowchart of the operation of a returned mailpiece system as implemented in accordance with an embodiment of the disclosure. In various embodiments, a returned mailpiece system is implemented to automate the processing of returned mailpieces. In this embodiment, returned mailpiece operations are begun in block 502, followed by the receipt of a returned mailpiece in block 504. The unique identifier associated with the returned mailpiece is then scanned in block 506. In various embodiments, the unique identifier comprises a barcode, such as a 3-D barcode, which is scanned by a barcode scanner. In various other embodiments, the unique identifier comprises a Radio Frequency Identifier (RFID) tag, which is scanned by an RFID scanner.

Once the unique identifier has been scanned, decoding operations are performed in block 508 to extract its corresponding recipient data, mailpiece data, and mailpiece operation rule. The extracted mailpiece operation rule is then processed in block 510 to initiate its corresponding returned mailpiece operation. A determination is made in block 512 whether to verify the accuracy of the recipient data associated with the returned mailpiece. If so, then a determination is made in block 514 whether to query a repository of recipient data, mailpiece data, and returned mailpiece operation rules for updates to the recipient data. If so, then the repository is queried for updates to the recipient data in block 516, followed by a determination in block 518 whether updates were found. If not, then a determination is made in block 520 whether to query a recipient data service provider for updates to the recipient data. As an example, the United States Postal Service (USPS) maintains an electronic Address Change Service (ACS), referred to as OneCode ACS, which is available to mailers who adopt the Intelligent Mailpiece Barcode (IMB) on their mailpieces. Commercial address change service providers are likewise known in the art.

If it is determined in block 520 to query a recipient data service provider for updates to the recipient data, then it is queried in block 522, followed by a determination in block 524 whether updates to the recipient data was found. If not, or if it was determined in block 520 not to query a recipient data service provider, then a determination is made in block 526 whether to contact the intended recipient of the mailpiece for updates to their corresponding recipient data. If so, then a communication method for communicating with the recipient is determined in block 528. In various embodiments, the communication method comprises an electronic communication such as an electronic mail message, an instant messaging (IM) message, a mobile phone text message, an on-line Website session, and the like. In various other embodiments, the communication method comprises a telephone call initiated by a user service representative to the intended recipient. Once the communication method is determined, the recipient data, mailpiece data, and returned mailpiece operation options, as described in greater detail herein, are provided in block 532. In various embodiments, the recipient data, mailpiece data, and returned mailpiece operation options are provided within a user interface (UI) of the returned mail system to either the intended recipient of the mailpiece or a user service representative.

A determination is then made in block 534 whether updates to the recipient data were received from the recipient. If so, then the recipient data is updated in the repository of recipient data, mailpiece data, and returned mailpiece operation rules in block 536. A determination is then made in block 538 whether to resend the mailpiece using the updated recipient data. If so, then the mailpiece is resent in block 540, using the updated recipient data. A determination is then made in block 548 whether to continue returned mailpiece operations. If so, the process is continued, proceeding with block 504. Otherwise, returned mailpiece operation is ended in block 550.

However, if it was determined not to verify recipient data accuracy in block 512, or not to establish communication with the recipient in block 530, or that no recipient data updates were received in block 534, or not to resend the mailpiece using updated recipient data in block 538, then a determination is made in block 542 whether to resend the mailpiece using the same recipient data. As an example, the intended recipient's recipient data, such as their name and address, has been verified and the mailpiece was returned for some other reason. If it is determined in block 542 to resend the mailpiece using the same recipient data, then the mailpiece is resent in block 544. The process is then continued, proceeding with block 548. However, if it is determined in block 542 not to resend the mailpiece using the same recipient data, then the recipient data is marked as incorrect in the repository of recipient data, mailpiece data, and returned mailpiece operation rules in block 546. The process is then continued, proceeding with block 548.

Figure 6:
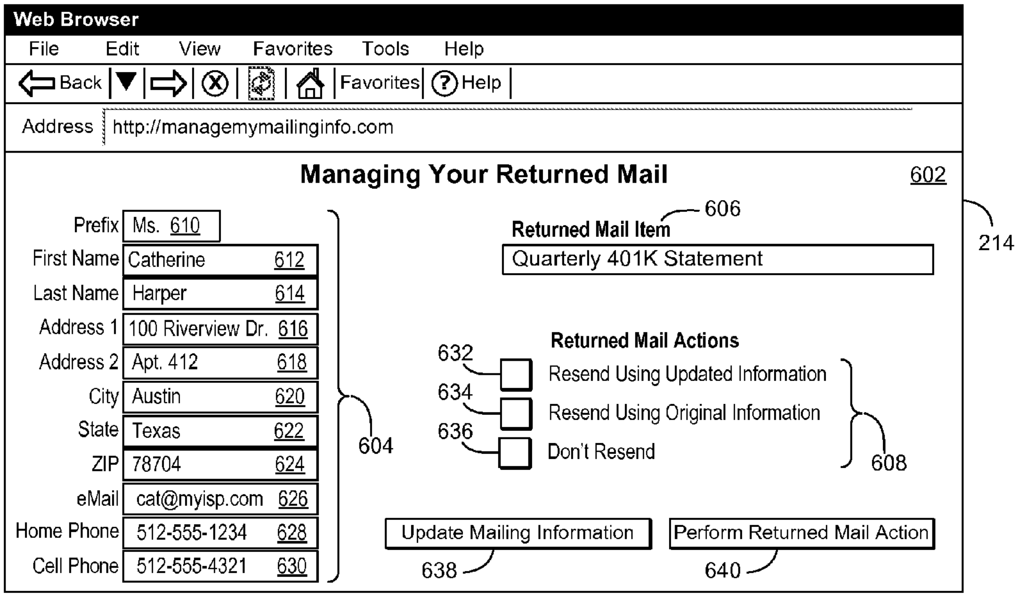
FIG. 6 is a simplified illustration of a returned mailpiece system as implemented within a window of a user interface in accordance with an embodiment of the disclosure for displaying recipient data, mailpiece data, and a plurality of returned mailpiece operations.

FIG. 6 is a simplified illustration of a returned mailpiece system as implemented within a window of a user interface in accordance with an embodiment of the disclosure for displaying recipient data, mailpiece data, and a plurality of returned mailpiece operations. In various embodiments, the recipient data, mailpiece data, and options for returned mailpiece operations are displayed to an intended recipient of a mailpiece, or to a user service representative, within a user interface of a computing device.

In this embodiment, a user interface (UI) 214 of a returned mailpiece system comprises a "Managing Your Returned Mail" window 602. The "Managing Your Returned Mail" window 602 comprises a plurality of recipient data fields 604, a 'Returned Mail Item' 606 mailpiece data field, and a plurality of 'Returned Mail Action' checkboxes 608, each corresponding to a returned mailpiece operation. The "Managing Your Returned Mail" window 602 further comprises 'Update Mailing Information' 638 and 'Perform Returned Mail Action' 640 command buttons. As illustrated in FIG. 6, the 'Returned Mail Item' 606 mailpiece data field has a value of 'Quarterly 401K Statement'. Each of plurality of recipient data fields 604 comprises a corresponding value for 'Prefix' 612, 'First Name' 614, 'Last Name' 616, 'Address 1' 618, 'Address 2' 620, 'City' 620, 'State' 622, 'ZIP' 624, 'eMail' 626, 'Home Phone' 628, and 'Cell Phone' 630. Likewise, the plurality of 'Returned Mail Action' checkboxes 608 comprises corresponding returned mailpiece operations for 'Resend Using Updated Information' 632, 'Resend Using Original Information' 634, and 'Don't Resend' 636.

Figure 7:
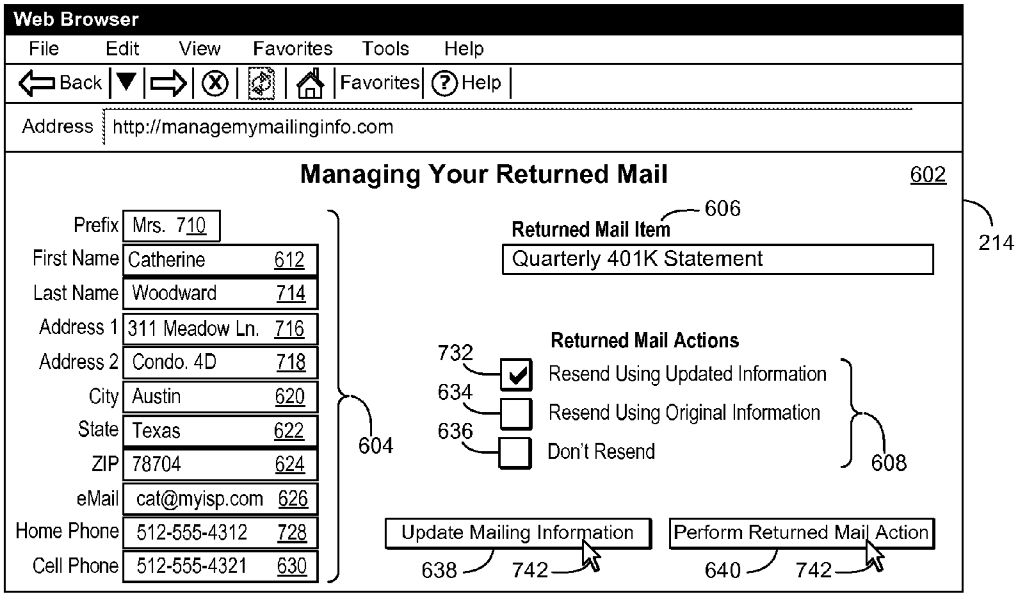
FIG. 7 is a simplified illustration of a returned mailpiece system as implemented within a window of a user interface in accordance with an embodiment of the disclosure for updating recipient data and initiating a returned mailpiece operation.

FIG. 7 is a simplified illustration of a returned mailpiece system as implemented within a window of a user interface in accordance with an embodiment of the disclosure for updating recipient data and initiating a returned mailpiece operation. As illustrated in FIG. 7, the recipient data fields 604 for 'Prefix' 712, 'Last Name' 716, 'Address 1' 718, 'Address 2' 720, and 'Home Phone' 728 have been modified from their corresponding values 612, 616, 618, 620, and 628 illustrated in FIG. 6. As likewise illustrated in FIG. 7, the 'Returned Mail Action' checkbox 608 corresponding to 'Resend Using Updated Information' 732 has been selected. In this and other embodiments, selection of the 'Update Mailing Information' 638 command button through a user gesture, such as a left-mouse-click with cursor 742, initiates the updating of the recipient data fields 604 in a repository of recipient data, mailpiece data, and returned mailpiece operation rules. Likewise, selection of the 'Perform Returned Mail Action' 640 command button through a user gesture, such as a left-mouse-click with cursor 742, initiates the returned mailpiece operation corresponding to 'Resend Using Updated Information' 732.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A system for processing a mailpiece, comprising:

a repository of recipient data, mailpiece data, and returned mailpiece operation rules; and processing logic operable to:

process said recipient data and said mailpiece data to generate a returned mailpiece operation rule;

encode said recipient data, said mailpiece data, and said returned mailpiece operation rule to generate a unique identifier that includes an optical code imprinted on said mailpiece, wherein said optical code includes a 3-D barcode; and associate said unique identifier with a corresponding mailpiece.

2. The system of claim 1, wherein said recipient data comprises a name and an address associated with an intended recipient of said mailpiece.

3. The system of claim 1, wherein said unique identifier comprises includes a radio frequency identifier (RFID) tag affixed to said mailpiece.

4. A non-transitory computer-usable medium embodying computer program code, the computer program code comprising computer executable instructions configured for:

using a repository of recipient data, mailpiece data, and returned mailpiece operation rules; and using processing logic to:

decode a unique code associated with an undeliverable mailpiece to extract said recipient data, said mailpiece data, and a returned mailpiece operation rule, wherein said unique code includes an optical code imprinted on said undeliverable mailpiece, wherein said optical code includes a 3-D barcode; and process said returned mailpiece operation rule to perform a corresponding returned mailpiece operation.

5. The computer usable medium of claim 4, wherein said recipient data comprises a first name and a first address associated with an intended recipient of said mailpiece.

6. The computer usable medium of claim 5, wherein said returned mailpiece operation comprises resending said mailpiece to said recipient using modified recipient data.

7. The computer usable medium of claim 5, wherein said returned mailpiece operation comprises resending said mailpiece to said recipient using unmodified recipient data.

8. The computer usable medium of claim 5, wherein said returned mailpiece operation comprises not resending said mailpiece to said recipient.

9. The computer usable medium of claim 5, wherein said returned mailpiece operation comprises:

processing said recipient data to determine an alternative means of communication to communicate with said recipient;

using said means of communication to communicate with said recipient; and receiving modifications to said recipient data from said recipient.

10. The computer usable medium of claim 4, wherein the computer executable instructions are provided to a client computer from a server, wherein said server is located at a remote location.

11. The computer usable medium of claim 4, wherein the computer executable instructions are provided as a service on an on-demand basis, wherein said service is provided by a service provider.

12. A non-transitory computer-usable medium embodying computer program code, the computer program code comprising computer executable instructions configured for:

scanning a unique identifier that includes an optical code imprinted on a returned mailpiece, wherein said optical code includes a 3-D barcode;

displaying returned mailpiece data to a recipient within a user interface, said returned mailpiece data comprising recipient data and mailpiece data; and receiving recipient input data within said user interface, said recipient input data comprising returned mailpiece operation instruction data to perform a corresponding returned mailpiece operation.

13. The computer usable medium of claim 12, wherein said recipient data comprises a first name and a first address associated with an intended recipient of said mailpiece.

14. The computer usable medium of claim 13, wherein said returned mailpiece operation comprises resending said mailpiece to said recipient using unmodified recipient data.

15. The computer usable medium of claim 13, wherein said returned mailpiece operation comprises not resending said mailpiece to said recipient.

16. The computer usable medium of claim 13, wherein said returned mailpiece operation comprises:

processing said recipient data to determine an alternative means of communication to communicate with said recipient;

using said means of communication to communicate with said recipient; and receiving modifications to said recipient data from said recipient.

17. The computer usable medium of claim 12, wherein said returned mailpiece operation comprises resending said mailpiece to said recipient using modified recipient data.

18. The computer usable medium of claim 12, wherein the computer executable instructions are provided to a client computer from a server, wherein said server is located at a remote location.

19. The computer usable medium of claim 12, wherein the computer executable instructions are provided as a service on an on-demand basis, wherein said service is provided by a service provider.

* * * * *